United States Patent [19]

Lenhardt et al.

[11] Patent Number: 4,866,832

[45] Date of Patent: Sep. 19, 1989

[54] PROCESS AND APPARATUS FOR CLOSING ONE END OF A TUBULAR BAR

[75] Inventors: Karl Lenhardt, Neuhausen-Hamberg; Manfred Weinbrecht, Parkstr. 5, D-7538 Keltern/Dietlingen, both of Fed. Rep. of Germany

[73] Assignees: Lenhardt Maschinenbau GmbH, Neuhausen-hamburg; Manfred Weinbrecht, Keitern/Dietlingen, both of Fed. Rep. of Germany

[21] Appl. No.: 100,285

[22] Filed: Sep. 23, 1987

[30] Foreign Application Priority Data

Sep. 24, 1986 [DE] Fed. Rep. of Germany ....... 3632324

[51] Int. Cl.[4] ....................... B21D 39/03; B23P 19/00

[52] U.S. Cl. ........................................ 29/428; 29/433; 29/241; 53/319; 53/489; 226/97; 254/134.4

[58] Field of Search ................. 53/319, 489, 476, 484, 53/320; 29/433, 241, 234, 421 R, 428, 700; 226/7, 97; 254/134.4

[56] References Cited

U.S. PATENT DOCUMENTS

| | | | |
|---|---|---|---|
| 2,622,306 | 12/1952 | Anderson | 226/97 |
| 2,814,172 | 11/1957 | Tommaney | 53/489 X |
| 2,971,243 | 2/1961 | Burns | 226/97 X |
| 3,079,673 | 3/1963 | Loehlein et al. | 254/134.4 X |
| 3,485,428 | 12/1969 | Jackson | 226/97 |
| 3,941,173 | 10/1975 | Sprague, Jr. | 226/7 X |
| 4,001,929 | 1/1977 | Ishikawa | 29/234 X |
| 4,691,486 | 9/1987 | Niekrasz | 52/172 |

FOREIGN PATENT DOCUMENTS

| | | | |
|---|---|---|---|
| 634783 | 1/1962 | Canada | 52/172 |
| 634850 | 1/1962 | Canada | 52/172 |

*Primary Examiner*—Charlie T. Moon

*Attorney, Agent, or Firm*—Balogh, Osann, Kramer, Dvorak, Genova & Traub

[57] ABSTRACT

A process is described in which a tubular bar (27) which is substantially but not entirely filled with flowable solids (28), is closed at one end. To close the tubular bar (27) at its end, a thread (3) is introduced into the tubular bar (27) and is caused to form a ball of thread therein. The thread (3) is preferably introduced into the tubular bar by being blown through a hollow needle (11).

15 Claims, 1 Drawing Sheet

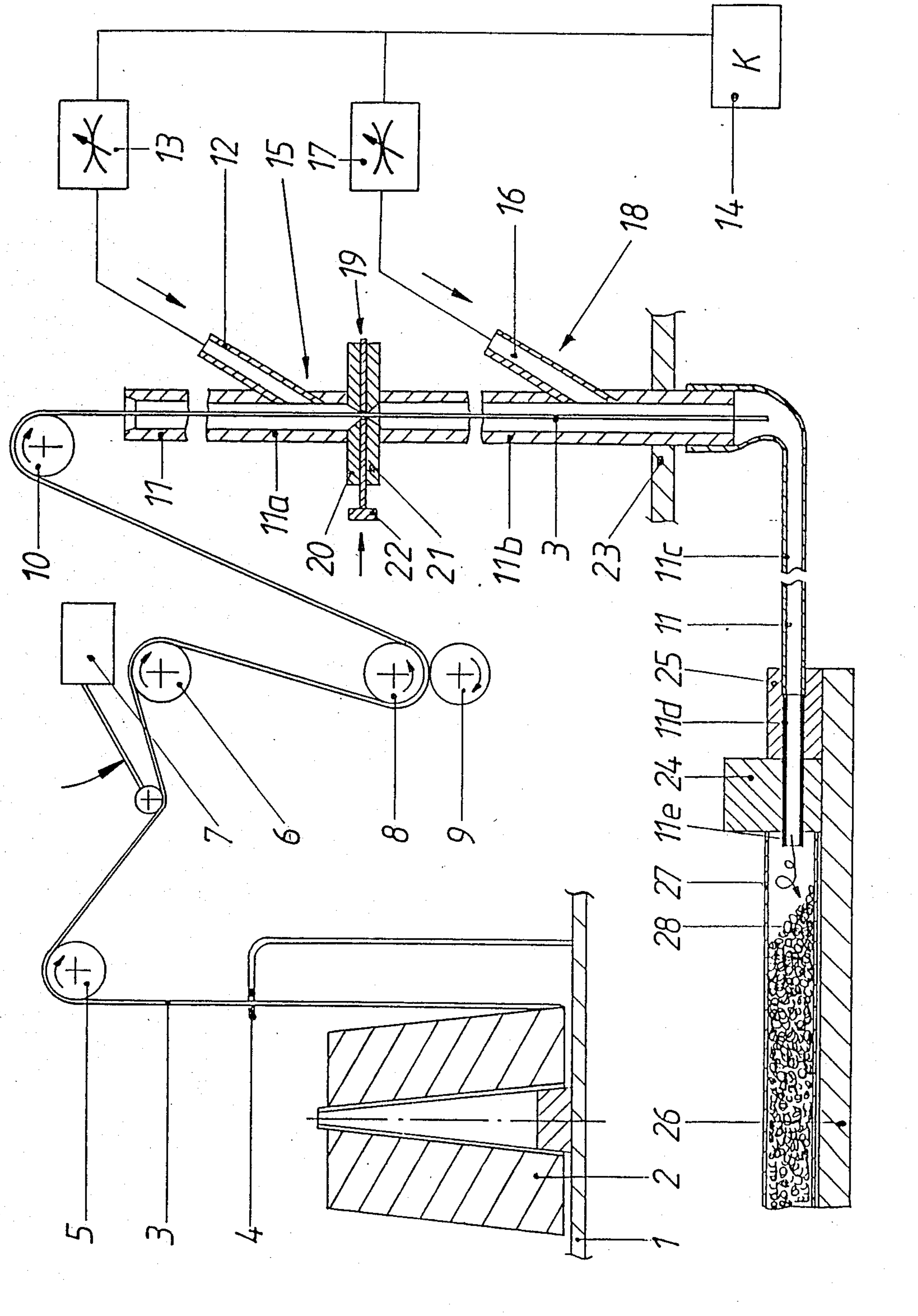
K
1
2
3
4
5
6
7
8
9
10
11
11a
11b
11c
11d
11e
12
13
14
15
16
17
18
19
20
21
22
23
24
25
26
27
28

PROCESS AND APPARATUS FOR CLOSING ONE END OF A TUBULAR BAR

BACKGROUND OF THE INVENTION

1. Field of the Invention

This invention relates to a process and apparatus for closing one end of a tubular bar, which is filled with flowable solids. Such tubular bars are used to make spacer frames for insulating glass. The tubular bars consist of aluminum or steel and are filled with a readily flowable, granular desiccant and are then processed further to form closed frames in that the bars are bent and/or are interfitted by means of connectors, which are fitted in alternation into the ends of the tubular bars. Perforation holes are usually provided on that side of the tubular bars which in the complete insulating glass pane faces the interior space of the insulating glass pane. Through said perforations the desiccant contained in the tubular bar can absorb and bind moisture from the interior of the insulating glass pane.

2. Description of the Prior Art

To prevent a flow of the desiccant out of the tubular bars during the process steps for making the spacer frames. The tubular bars must be closed at their ends. This has usually been effected in that a foamed rubber plug has been inserted into each end of each tubular bar. To retain the foamed rubber plugs in the tubular bars, said plugs are initially thicker than the tubular bars and are compressed with the fingers and when compressed are pushed into the tubular bars, where they tend to expand so that they are sufficiently retained. It is also known to insert into one of the two ends of a tubular bar at the beginning a connector which will be required in any case for the formation of a closed frame and to insert a foamed rubber plug only into the opposite end of the tubular rod.

The use of foamed rubber plugs to seal the tubular bars has the disadvantage that the plugs may easily be chafed and caught at edges, corners and burrs of the tubular bars so that portions of the foamed rubber plugs can be worn off or torn off. This is undesirable because such detached foamed rubber particles may deposit on the outside of the spacer frame or may contaminate the work-place. Besides, foamed rubber plugs cannot easily be used in an automatic process of closing tubular bars.

SUMMARY OF THE INVENTION

It is a first object of the invention to eliminate said disadvantages by the provision of a new process which is of the kind described first hereinbefore and in which foamed rubber plugs are not required and which permits a clean operation that can be automated.

It is a second object of the invention to provide for carrying out the process a reliably operating apparatus which is simple and economical.

As applied to a process, the invention suggests to accomplish the first object set forth hereinbefore by the provision of a process of closing one end of a tubular bar which is substantially but not entirely filled with flowable solids, particularly for use in the making of spacer frames for insulating glass, wherein a thread is introduced into the tubular bar and is caused to form a ball of thread therein.

As applied to an apparatus the invention suggests to accomplish the second object set forth hereinbefore by the provision of an apparatus for closing one end of a tubular bar which is substantially but not entirely filled with flowable solids. The apparatus comprises a hollow needle, means for threading a thread into said hollow needle, and blowing means for blowing air into the hollow needle at a point which is upstream of the forward end of the hollow needle.

Numerous advantages are afforded by a process in which a tubular bar which is substantially but not entirely filled with flowable solids is closed at one end in that a thread is introduced into an unfilled end portion of the tubular bar and the thread is caused to form a ball of thread in such end portion. In the first place a thread is relatively small in cross-section and for this reason can easily be introduced into a tubular bar without being chafed or caught at the edge of said bar. For this reason there is no risk of a wearing or tearing of lint from the thread. In the second place, threads to be processed can easily be withdrawn from a roll. In the third place the ball of thread can very easily be formed in the tubular bar because a thread which has been introduced into the tubular bar will readily form irregular loops as soon as it strikes an obstacle and will thus be formed into a ball of thread as long as additional thread is introduced from the outside. In the fourth place the roughness of the inside surfaces of the tubular bar, the burrs and other projections existing on said surfaces as a result of the manufacture of the tubular bar will be sufficient to ensure that the ball of thread when it has been formed will sufficiently firmly be retained in the tubular bar, particularly because the retaining force which the ball of thread must be able to take up is only small. In the fifth place the process can easily be adapted to tubular bars which differ in cross-sectional area because threads having a larger or shorter length depending on the cross-section of the bar have been cut from the roll of thread and formed into relatively large or relatively small balls. In the sixth place the thread is a dry material, which can easily be handled and need not meet special quality requirements and which can be processed at any temperature with extremely simple mechanical means and which is available at any time. In the seventh place the use of a thread will not involve a need for waiting times (heating-up times or the like) when an apparatus for carrying out the process in accordance with the invention is put into operation. In the eighth place the step of feeding and introducing a thread length into an end of a tubular bar can easily be automated.

On principle, a mechanical thread feeder might be used to introduce the thread into the tubular bar. But it will be particularly desirable to blow the thread into the tubular bar so that the thread can be introduced into the tubular bar at a high velocity and the turbulence of the blown air in the tubular bar will promote the formation of a ball of thread.

In order to ensure that the thread will not be chafed or caught at the edge of the tubular bar, the thread is desirably introduced into the tubular bar by means of a hollow needle, which extends into the tubular bar. It will be recommendable to cover the respective end of the tubular bar as the thread is blown into the bar in order to ensure that the flowing air will not move the thread out of the tubular bar. The end of the tubular bar need not be airtightly sealed. It may even be desirable to leave certain gaps, which are so narrow that the thread does not extend through said gaps but which facilitate the outflow of the blown air. In connection with tubular bars for spacer frames for insulating glass, which bars are perforated on one side, the perforation holes will be sufficient to permit an escape of the air which has been blown into the bar. Besides, air can flow through the loosely packed flowable solids and may escape from the opposite end of the tubular bar.

For an accommodation of balls of thread in the tubular bar, the bar must contain an adequate free space. To make sure that the intended free space is sufficiently large, it is recommendable to suck part of the flowable solids from the end portion of the tubular bar, e.g., in that the end of the tubular bar is moved for a short time past a suction nozzle, which extracts surplus solids from the tubular bar.

The threads used in the process in accordance with the invention preferably consist of wool because the surface texture of such threads will promote the felting thereof so that they can easily form durable balls of thread.

The apparatus in accordance with the invention for carrying out the new process comprises as essential elements a hollow needle, through which an unballed thread can continuously be fed, means for introducing the thread into said hollow needle, and blowing means for blowing air into the hollow needle at a point which is upstream of the forward end of the hollow needle. The blown air serves as an entraining fluid for the thread and causes the thread to emerge from the forward end of the hollow needle. When the forward end of the hollow needle is inserted into the end of the tubular bar, the thread emerging from the hollow needle will readily form in the tubular rod a ball of thread in a size which will depend on the length and thickness and nature of the thread.

The blowing means are preferably connected to the hollow needle by an injector, e.g., in that a compressed air is supplied through a bore, which is forwardly inclined toward the forward end of the hollow needle and opens into the hollow needle. A thread which has been introduced into the hollow needle will be entrained to and out of the forward end of the hollow needle by a burst of compressed air from a compressed air source. The free end portion of the hollow needle is preferably enclosed by a covering member, which can be engaged with the end of each tubular bar in order to ensure that a thread which has been blown into the tubular bar will not be carried by the air out of the bar. The forward extremity of the hollow needle preferably protrudes slightly beyond the covering member so that the thread can be more easily introduced into the tubular bar. A projection of 1 to 2 mm will be quite sufficient. To ensure that the air which has been blown into the hollow needle by means of the injector will not escape from the hollow needle at its rear end, the hollow needle is preferably adapted to be closed between the rear end of the hollow needle and the mouth of the injector. It will be particularly desirable to provide such closing means in the form of a cutter blade, which is moved to an open position when a thread is to be introduced into the hollow needle and which will sever the thread from the thread supply when the cutter blade is moved to close the hollow needle.

BRIEF DESCRIPTION OF THE DRAWING

The drawing is a diagrammatic representation of an illustrative embodiment of the invention.

DETAILED DESCRIPTION OF THE PREFERRED EMBODIMENT

A roll 2 of thread is freely rotatably mounted on a stand 1. A thread 3 is being unwound from said roll and is initially moved through an eyelet 4 and then trained around two deflecting rollers 5 and 6, which are disposed on opposite sides of a thread tensioner 7. The thread 3 is subsequently delivered to a cyclically operating thread feeder, which in the present case comprises a driven roller 8 and a roller 9, which is resiliently urged against the roller 8 and either rotates freely with the roller 8 or is driven to rotate synchronously with the roller 8 in the opposite sense. The thread coming from the thread feeder 8, 9 is trained around another deflecting roller 10 and then enters a hollow needle 11, which comprises four consecutive length portions **11*a*, 11*b*, 11*c* and 11*d*. A small tube 12 which is inclined with respect to the hollow needle laterally enters the first length section 11*a* of the hollow needle and by a solenoid valve 13 is connected to a compressed air source 14, such as a compressor. A second injector 18 is provided in a similar manner in the adjacent second length section 11*b* of the hollow needle and consists of an inclined small tube 16, which is connected to the compressed-air source 14 by a solenoid valve 17**.

A cutting device 19 is provided between the two length sections **11*a* and 11*b* of the hollow needle and consists of two stationary cutter rings 20 and 21 and a transversely displaceable cutter blade 22, which is disposed in the gap between the two cutter rings 20 and 21. The annular knife edges of the two cutter rings 20 and 21 are disposed inside the hollow needle 11**.

In the illustrated embodiment the hollow needle is secured to a flange 23 and extends therethrough. A third length section **11*c* of the hollow needle consists of a flexible tube, which consists of a smooth plastic, such as a polyamide, and is fitted on that end of the second length section 11*b* of the hollow needle which protrudes beyond the flange 23. The flexible tube 11*c* is connected by a butt joint to the fourth length section 11*d* of the hollow needle. That fourth length section 11*d* consists of a small tube, which is fitted in a cover block 24. The third and fourth length sections of the hollow needle are interconnected by a sleeve 25 at the rear of the cover block 24**.

The cover block 24 is slidably mounted on a deck 26, which also supports a tubular bar 27, which with the exception of an unfilled end portion is filled with flowable granular solids 28.

The mode of operation of the apparatus is as follows: At the beginning, the thread 3 is trained by hand around the deflecting rollers 5 and 6 and is passed between the rollers 8 and 9 of the thread feeder, then trained around the roller 10 and introduced into the hollow needle 11 until the leading end of the thread is disposed below the cutting device 19, which is in an open position. When a tubular bar has not yet been placed in front of the cover block 24, the cutter blade 22 is then operated to sever the thread and to close the hollow needle between the length sections **11*a* and 11*b*. The solenoid valve 17 is then opened so that air is blown into the hollow needle below the cutter blade 22 and said air will blow the severed thread out of the hollow needle 11. The solenoid valve 17 is subsequently closed. A tubular bar 27 can now be placed on the deck 26 so that one end of the bar 27 engages the cover block 24 and the forward end 11*e* of the hollow needle protrudes to some extent into the tubular bar 27. The cutter blade 22 is now retracted to open the cutting device 19. The thread feeder 8, 9 is operated for a preselected period of time to withdraw a preselected length of the thread 3 from the roll of thread 2 and to feed the thread in the same length into the hollow needle 11. This is assisted in that the solenoid valve 13 is opened to operate the injector so that the thread hanging in the first length section 11*a* of the hollow needle will be urged downwardly. When the thread feeder 8, 9 has pulled the thread in the preselected length from the roll of thread 2 and has delivered that thread length to the hollow needle, the means for driving the thread feeder 8, 9 are stopped, the solenoid valve 13 is closed, the cutting device 19 is operated to sever the thread and the length section 11*b* of the hollow needle is closed at its top. The solenoid valve 17 is now opened so that the second injector 18 is operated to blow air into the hollow needle and said air entrains the severed thread out of the hollow needle 11 and into the tubular bar 27, where the thread is formed into a ball in the free space between the flowable solids 28 and the cover block 24. The solenoid valve 17** is then closed and the cycles of operations which have been described can be repeated to close a succeeding tubular bar.

We claim:

1. A method of closing an unfilled end portion of a perforated tubular bar which is filled elsewhere with flowable solids for use in the manufacture of spacer frames for insulating glass comprising the steps of blowing a thread into said unfilled end portion and causing it to form a ball of thread therein.

2. A method as set forth in claim 1, including the step of blowing said thread through a hollow needle which protrudes into said end portion.

3. A method as set forth in claim 3, including the step of covering said tubular bar at the extreme end of said unfilled end portion while the thread is blown into the same.

4. A method as set forth in claim 1, including the step of sucking a part of said flowable solids from said end portion before blowing said thread into the same.

5. A method as set forth in claim 1, using a thread of wool.

6. A method of closing an unfilled end portion of a perforated tubular bar which is filled elsewhere with flowable solids for use in the manufacture of spacer frames for insulating glass comprising the steps of inserting a hollow needle into said unfilled end portion, blowing a thread into said unfilled end portion via said hollow needle and causing the thread to form a ball in said unfilled portion.

7. A method of closing an unfilled end portion of a perforated tubular bar which is filled elsewhere with flowable solids for use in the manufacture of spacer frames for insulating glass comprising the steps of inserting a hollow needle into said unfilled end portion, covering said tubular bar at the extreme end of said unfilled portion around the hollow needle, blowing a thread into said unfilled end portion via said hollow needle and causing the thread to form a ball in said unfilled portion.

8. An apparatus for closing an unfilled end portion of a perforated tubular bar which is filled elsewhere with flowable solids for use in the manufacture of spacer frames for insulating glass, comprising

- a hollow needle having a forward end,
- means for inserting the forward end of the hollow needle into the unfilled end portion of said tubular bar,
- thread-introducing means for introducing a thread into said hollow needle at a distance from said forward end, and
- blowing means for blowing air into said hollow needle at a location which is upstream from said forward end.

9. An apparatus as set forth in claim 8, wherein said blowing means comprise an injector, which is connected to said hollow needle.

10. An apparatus as set forth in claim 8, wherein said hollow needle has a forward end portion which is closely surrounded by a covering member which is engageable with said tubular bar.

11. An apparatus as set forth in claim 10, wherein said forward end of said hollow needle protrudes from said covering member into said unfilled portion of said tubular bar.

12. An apparatus as set forth in claim 8, wherein closing means are provided for closing said hollow needle downstream of said blowing means.

13. An apparatus as set forth in claim 12, wherein said closing means comprise a cutter blade.

14. An apparatus as set forth in claim 13, wherein said thread-introducing means comprise a second injector for delivering said thread to said cutter blade.

15. An apparatus as set forth in claim 14, wherein a cyclically operable thread feeder having an adjustable feed step length is provided for delivering said thread to said second injector.

* * * * *